(12) United States Patent
Lescourret et al.

(10) Patent No.: US 7,241,026 B2
(45) Date of Patent: Jul. 10, 2007

(54) HIGH-LUMINANCE LIGHT BOX FOR DISPLAYS

(75) Inventors: Jean-Louis Lescourret, Merignac (FR); Serge Ediar, Lege Cap Ferret (FR); Thomas Espaignet, Cenon (FR)

(73) Assignee: Thales, Neuilly sur Seine (FR)

( * ) Notice: Subject to any disclaimer, the term of this patent is extended or adjusted under 35 U.S.C. 154(b) by 64 days.

(21) Appl. No.: 10/524,835

(22) PCT Filed: Aug. 11, 2003

(86) PCT No.: PCT/EP03/50372
§ 371 (c)(1), (2), (4) Date: Feb. 18, 2005

(87) PCT Pub. No.: WO2004/019121
PCT Pub. Date: Mar. 4, 2004

(65) Prior Publication Data
US 2005/0231956 A1  Oct. 20, 2005

(30) Foreign Application Priority Data
Aug. 20, 2002  (FR) ................... 02 10414

(51) Int. Cl.
*F21V 1/00* (2006.01)
(52) U.S. Cl. ................ 362/240; 362/223
(58) Field of Classification Search ........ 362/29, 362/30, 614, 223, 240, 373
See application file for complete search history.

(56) References Cited

U.S. PATENT DOCUMENTS

| 5,057,744 | A | 10/1991 | Barbier et al. |
|---|---|---|---|
| 5,661,608 | A | 8/1997 | Barbier |
| 5,791,770 | A * | 8/1998 | Hoyt et al. .................. 362/294 |
| 5,975,722 | A | 11/1999 | Van Duijneveldt |
| 6,570,710 | B1 * | 5/2003 | Nilsen et al. ................ 359/625 |
| 6,791,528 | B2 * | 9/2004 | Adler .......................... 345/102 |

FOREIGN PATENT DOCUMENTS

| EP | 0 540 140 | 5/1993 |
|---|---|---|
| EP | 0 992 837 | 4/2000 |
| JP | 11039915 | * 2/1999 |

* cited by examiner

*Primary Examiner*—Thomas M. Sember
*Assistant Examiner*—Julie A. Shallenberger
(74) *Attorney, Agent, or Firm*—Lowe Hauptman & Berner, LLP

(57) ABSTRACT

The invention relates to light boxes comprising fluorescent tubes, which are used to illuminate display screens with optical valves, in particular liquid-crystal matrix screens. More specifically, the invention is suitable for use in the field of head-up or medium-head collimated displays used on aircraft. The invention consists in improving the photometric properties of said light boxes using a novel fluorescent tube arrangement, whereby said tubes are distributed over several stacked layers. In this way, the number of fluorescent tubes present in the light box is increased and acceptable heating is maintained. The photometric performances of the light box are thus increased while the correct service life of the tubes is retained.

19 Claims, 6 Drawing Sheets

HIGH-LUMINANCE LIGHT BOX FOR DISPLAYS

CROSS-REFERENCE TO RELATED APPLICATIONS

The present Application is based on International Application No. PCT/EP2003/050372, filed on Aug. 11, 2003, which in turn corresponds to FR 02/10414 filed on Aug. 20, 2002, and priority is hereby claimed under 35 USC §119 based on these applications. Each of these applications are hereby incorporated by reference in their entirety into the present application.

FIELD OF THE INVENTION

The field of application of the invention is that of light boxes used to illuminate display screens with optical valves, in particular for liquid-crystal matrix screens. More specifically, the invention is suitable for use in the field of head-up or medium-head collimated displays used on aircraft.

In the aeronautical domain, some of the piloting and navigation information is presented on collimated electronic display devices. This information is presented, either superimposed on the external landscape, in which case the system is called a head-up display (HUD), or without superimposition on the external environment, in which case it is called a medium-head display or medium-head collimated display (MHC). The medium-head display can be incorporated in a head-up display to obtain continuity in the collimated images. By the display of collimated images, the pilot thus switches from a view of the external environment to a view of the information without any visual adaptation time.

DESCRIPTION OF THE PRIOR ART

A medium-head or head-up display mainly comprises an electronic information display screen, a collimation optics device normally comprising a number of optical groups and mirrors enabling the different optical groups to be positioned within the confined space of the cockpit. As an example, FIG. 1 represents a schematic diagram of a medium-head display 2 with its display screen 1, its collimation optics 3, its folding mirrors 4. The collimated image is returned to the eye 5 of the pilot. The offset form of the collimation optics makes it possible to have the medium-head display 2 in a head-up display, not shown in FIG. 1.

The display screen should have, among other things, four main features which are:

a high maximum luminance for daytime uses, of around 600 cdm$^{-2}$;

a very low minimum luminance for nighttime uses, of around 0.1 cdm$^{-2}$, in particular in the case of use of the display with light-intensifying goggles;

excellent evenness of lighting. Normally, the evenness U is defined as follows:

$U=(L_{max}-L_{min})/(L_{max}+L_{min})$

With $L_{max}$, $L_{min}$: maximum and minimum luminance levels measured on the screen for a given luminance.

Normally, evenness values less than 50% will be tolerated, with this value possibly being reduced to 20% for certain applications.

A well defined cone of rays. The cone of rays corresponds to the solid angle within which the luminance remains greater than half of its maximum value. The ideal solid emission angle is around 30 degrees. Below this value, the pilot will no longer have a sufficiently luminous image throughout the possible field of movement of his head; beyond this value, some of the light energy emitted is lost.

Currently, the display screens used for medium-head displays are devices with optical valves, and more particularly with liquid-crystal matrix screens. As is indicated in FIG. 2, these devices mainly comprise an optical valve 6 operating in transmission mode and a light box 7. The light box includes a mechanical structure 8, a lighting device 9, normally made up of cylindrical fluorescent tubes and optical devices 10 for making the light flux originating from the lighting device 9 even. The image is formed by modulation of the light from the lighting device 9 by the display screen 6.

The lighting sources are normally arranged in a single layer. These are, for example, cylindrical fluorescent tubes of long length (typically: 100 mm) and small diameter (typically: 3 mm), normally with cold cathode (cold cathode fluorescent lamp, CCFL). The fluorescent tubes offer the advantages of having an optimal electrical energy to light energy conversion efficiency, of having a spectral distribution of the emitted light well suited to this type of display and of having a high service life.

Although the sources have a high intrinsic luminance, of around 40 000 cdm$^{-2}$ for fluorescent tubes, the maximum luminance remains difficult to achieve. In practice, on the one hand, some of the light is lost inside the box by diffusion and absorption and, on the other hand, the screen has a very low intrinsic transmission, of just a few percentage points. Finally, less than one percent of the light emitted by the sources contributes to the luminance of the image.

A first possible solution consists in increasing the luminance of the sources by increasing their power supply current; a few milliamperes for a fluorescent tube. Unfortunately, the service life of the sources drops in this case significantly when the current is increased and, above a certain intensity value, the efficiency of the sources levels off and then decreases.

Another solution consists in increasing the number of sources of the lighting layer. However, the inevitable closing up of these sources presents a number of major problems. For example, electromagnetic couplings are created between the tubes when they are too close together. Conventionally, the space between tubes should be greater than or equal to the diameter of an individual tube. These couplings can cause flash-overs between electrodes in certain aeronautical environmental conditions such as low pressures and high relative humidity levels. Furthermore, although the light sources offer a high efficiency, nearly 80% of the electrical energy consumed by the sources is lost as heat; this thermal energy becomes very difficult to release given that the sources are contained in a narrow space. Also, any increase in temperature of the sources above a certain temperature normally causes their conversion efficiency to drop.

SUMMARY OF THE INVENTION

The invention proposes to overcome these various problems. The basis of the invention is to have the lighting sources no longer in a single layer but in several stacked layers. In this way, the number of sources present in the light box is multiplied while retaining sufficient spacing between the different sources. The photometric performances of the light box are then increased, and in particular the possible maximum luminance, while the correct service life of the sources is retained. The invention is applied advantageously when the lighting sources are fluorescent tubes.

More precisely, the object of the invention is to produce a light box for display screen with optical valve comprising a lighting system made up of several light sources, said box comprising at least one mechanical structure, said structure including a top recess, side walls and a bottom, the optical valve being positioned in said top recess, characterized in that said light sources are distributed over several stacked layers, said planes of the layers being parallel to each other and parallel to the plane of the optical valve.

There are various possible types of light sources, such as, for example, light-emitting diodes. This principle nevertheless advantageously applies to cylindrical fluorescent tube type light sources, the axes of the fluorescent tubes of each layer are then parallel to each other, equidistant by a first distance and situated in one and the same layer plane.

Advantageously, the axes of the fluorescent tubes of a first layer are parallel to the axes of the fluorescent tubes of a second layer succeeding the first layer, said axes of said first layer being offset in a direction at right angles to that of the axes of the tubes of said second layer by a second distance equal to half the first distance. In practice, if the fluorescent tubes of a first layer are situated immediately below the tubes of a second layer of fluorescent tubes, some of the radiation of said tubes of said first layer will be lost by absorption by the tubes of the second layer. To minimize this effect, the optimal way to position the fluorescent tubes is to offset the tubes of one layer relative to the tubes of the next layer. The result is then both better efficiency and better evenness of lighting.

Advantageously, two successive layers are separated by a third distance approximately equal to the first distance. This arrangement means that the filling of the space occupied by the fluorescent tubes is optimized while retaining for all the fluorescent tubes an inter-tube distance that is constant and sufficient to avoid flash-over effects. If the first distance is approximately equal to the maximum diameter of the fluorescent tubes, the occupancy of the light box space is optimized. Looking down from above the box, only an evenly lit area can then be seen, the spaces between the tubes of the top layer of tubes being precisely lit by the tubes of the layer immediately below.

Advantageously, the number of light sources decreases arithmetically between two successive layers, the maximum number of sources being placed at the bottom of the light box. As an example, the layer located at the bottom of the box can have seven fluorescent tubes, the next layer six tubes, the next five, and so on. This arrangement provides for solid emission angles that are narrower and better suited to the solid viewing angle of the pilot. In practice, the fluorescent tubes have a quasi-lambertian emission pattern ill suited to collimated display applications. This arrangement makes it possible to create narrower angular emission lobes.

Advantageously, the axes of the fluorescent tubes of a first layer and the axes of the fluorescent tubes of a second layer succeeding the first layer are at right angles to each other. This particular arrangement provides for a uniform lighting area, regardless of the angle from which the display screen is viewed.

Advantageously, at least two different and independent electrical power supplies power the different light source layers. In a particular embodiment, one electrical power supply powers no more than three light sources. In a second embodiment, at least one layer of light sources is powered by two different and independent electrical power supplies. These arrangements present a number of advantages. On the one hand, the failure of one of the light source power supplies will not result in total loss of lighting, so protecting the display device. On the other hand, the lighting dynamic range is very high, around 6000. To obtain a variation in the lighting from the light sources, the sources are, normally, powered by a temporally modulated current (modulated by the Pulse Width Modulation, PWM, principle). Thus, during a first given time period, the power supply is activated, then cut off for a second period. Together, the two consecutive periods form a power supply cycle. The cycle is reproduced at a given frequency. The ratio of the duration of the first period to the overall cycle time gives the percentage of the light flux emitted by the source. When seeking to achieve wide luminance dynamic ranges, the duration of the activation period becomes too low for low luminance levels. In practice, on the one hand, it becomes difficult to control the switching on of the sources if the on times are too short and, on the other hand, flicker effects appear. To reduce the modulation amplitude, one solution involves, initially, completely cutting off the power supply to certain light source layers and/or cutting off the power supply to certain light sources of one and the same layer to reduce the luminance dynamic range. On the sources still activated, the temporal modulation is then retained to achieve very low luminance levels. To obtain an optimized solution, the luminance of the screen obtained by the light sources still powered is at most equal to approximately 10% of the maximum possible luminance on said screen.

Advantageously, the structure of the light box includes two mechanical subassemblies, the first subassembly comprises the top part of the side walls and the top recess, the second subassembly comprises the bottom part of the side walls and the bottom, the light sources being positioned in the second subassembly, the first subassembly being made of a thermal insulating material and the second subassembly being made of a good heat-conducting material. This arrangement makes it possible to maximize the insulation of the display screen from the heat released by the light sources. To further improve this insulation, a plate of transparent material coated with at least one heat-conducting treatment separates the two mechanical subassemblies and insulates the light sources from the display screen. In practice, heating of the optical valve due to the light sources is prejudicial to the operation of the latter, reducing in particular the transmission of the optical valve when the latter is a liquid-crystal matrix. For example, with no particular precautions, the heating due to the lighting tubes can reach 60° for a conventional light box. A thermal barrier positioned inside the light box between the light sources and the display screen strongly reduces the heating effect. A plate of transparent material covered with a conductive material completes this function. In the preceding example, the result obtained is a temperature rise reduced to 20 degrees at the cost of a reduced light loss. The conductive treatment is, for example, of ITO (indium and titanium oxide) type. To enhance either the spectral distribution, or the spatial distribution of the light rays emitted, the light box includes spectral optical filter or optical diffuser or optical deflector type optical elements.

Advantageously, the light sources are fluorescent tubes, the ends of the fluorescent tubes being covered with an electrically-insulating material and a separate heat-conducting material, said ends being inserted in the bottom of the box, said bottom also being made of a heat-conducting material. To avoid excessive heating of the fluorescent tubes, the heat energy emitted must be discharged as much as possible. The thermal conductivity of the tubes is optimized by covering the ends of the fluorescent tubes with an electrically-insulating material and a separate heat-conducting material, the bottom of the light box also being made of a heat-conducting material, such as aluminum, for example. The external part of the bottom of the box has cooling fins associated with a forced cooling system.

Advantageously, the display screen with optical valve is an active liquid-crystal matrix used for head-up or medium-head display type collimated display devices.

BRIEF DESCRIPTION OF THE DRAWINGS

The invention will be better understood, and other advantages will become apparent on reading the description that follows, given by way of nonlimiting example and using the appended figures, in which.

DETAILED DESCRIPTION OF THE INVENTION

Figure 1:
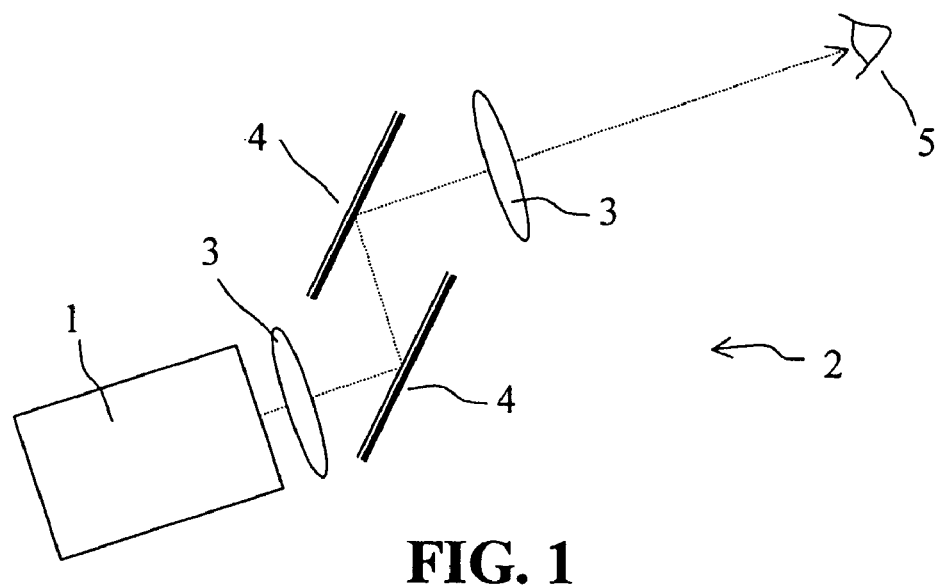
FIG. 1 represents the conventional diagram of a medium-head type display.
Figure 2:
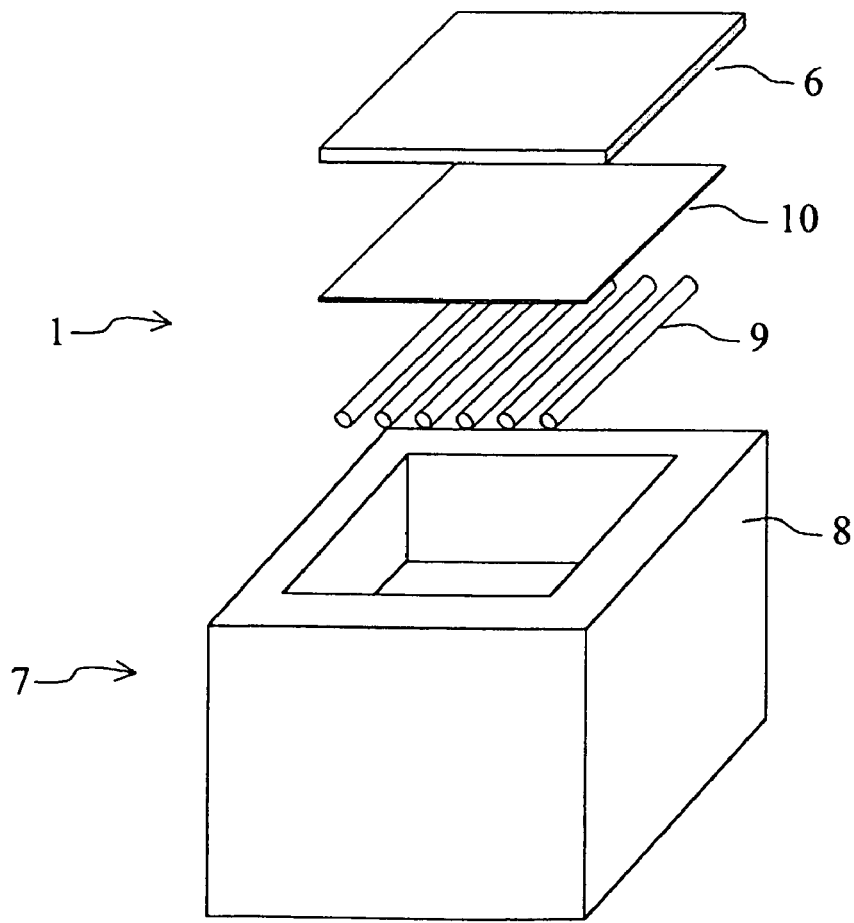
FIG. 2 represents an exploded view of a display screen with optical valve and its associated light box according to the prior art.
Figure 3:
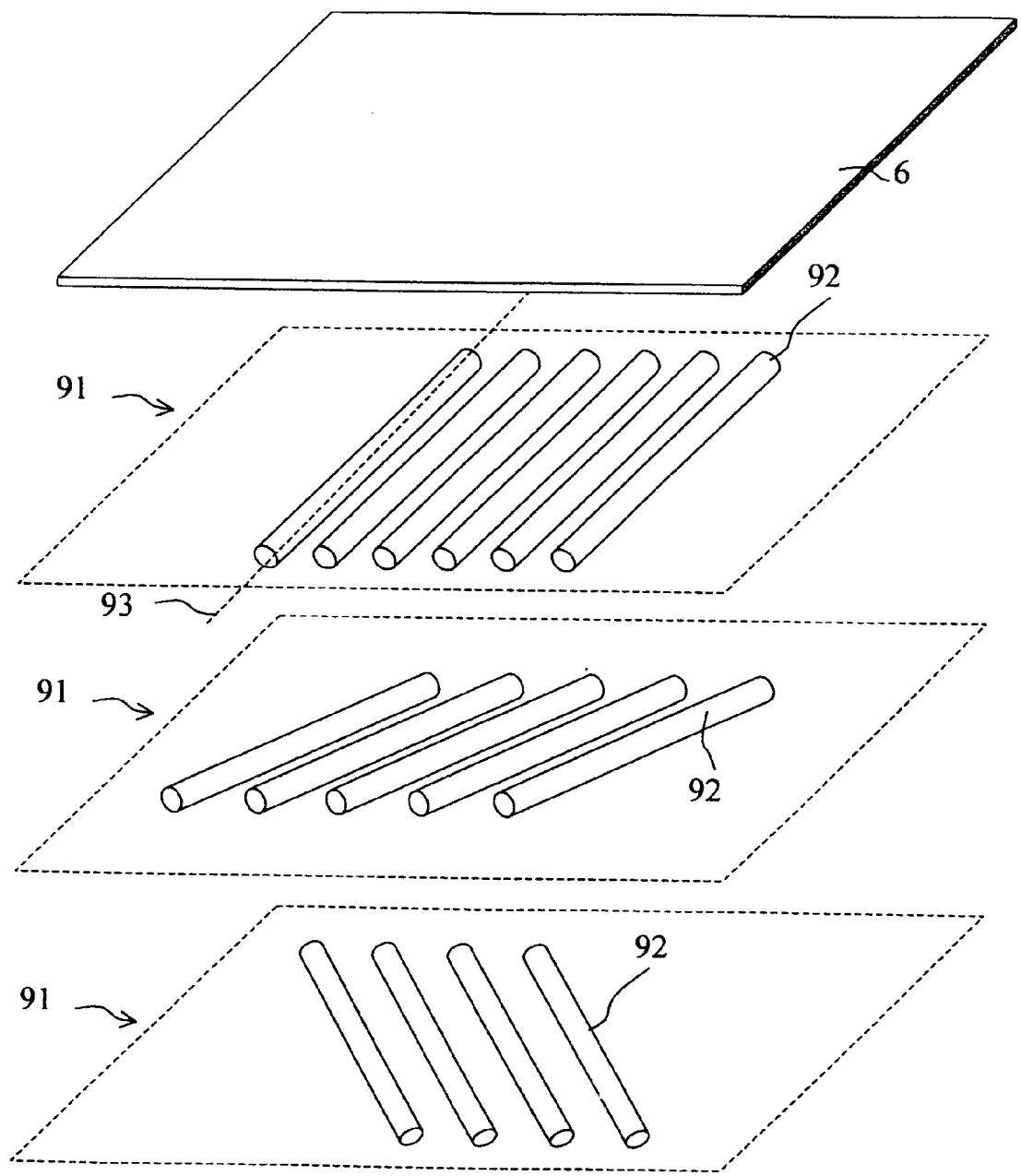
FIG. 3 represents a general view of the theoretical arrangement of the lighting tubes according to the invention.

FIG. 3 represents the general arrangement of the light sources in the case of fluorescent tubes 92 according to the invention. They are organized in stacked layers 91. Each layer is made up of a number of cylindrical fluorescent tubes. The axes 93 of said tubes of each layer are situated in a common plane, are parallel to each other and equidistant. The layer planes 91 are parallel to each other and parallel to the plane of the optical valve 6.

Figure 4:
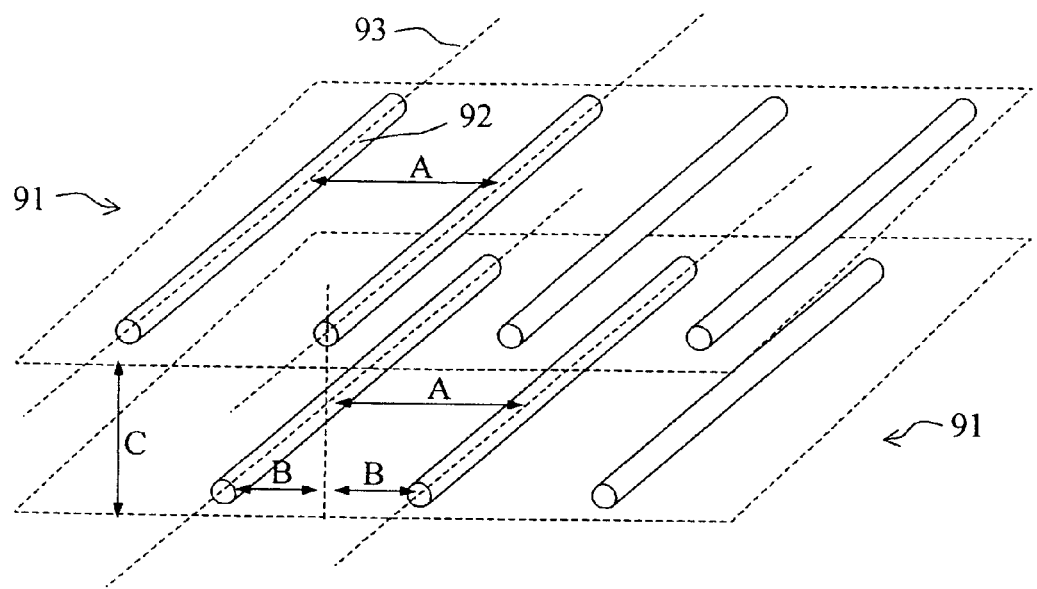
FIG. 4 represents a first variant of said arrangement according to the invention.

FIG. 4 shows a first variant of the general arrangement of FIG. 3. The axes 93 of the fluorescent tubes 92 of the different layers 91 are all parallel to each other. The tubes 92 of one and the same layer are separated by a distance A and the tubes of a first layer are offset by a distance B from the tubes of the next layer. Two successive layers are separated by a distance C. In a first particular embodiment, the distance B is equal to half of A. In a second embodiment, the distance C is approximately equal to A.

Figure 5:
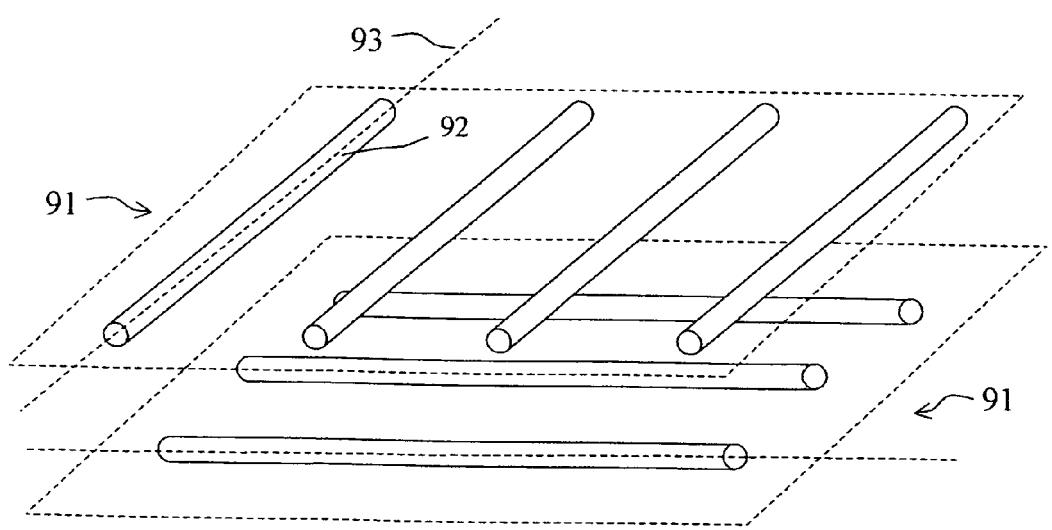
FIG. 5 represents a second variant of said arrangement.

FIG. 5 shows a second variant of the general arrangement. In this variant, the axes 93 of the tubes of two successive layers 91 are at right angles to each other.

Figure 6:
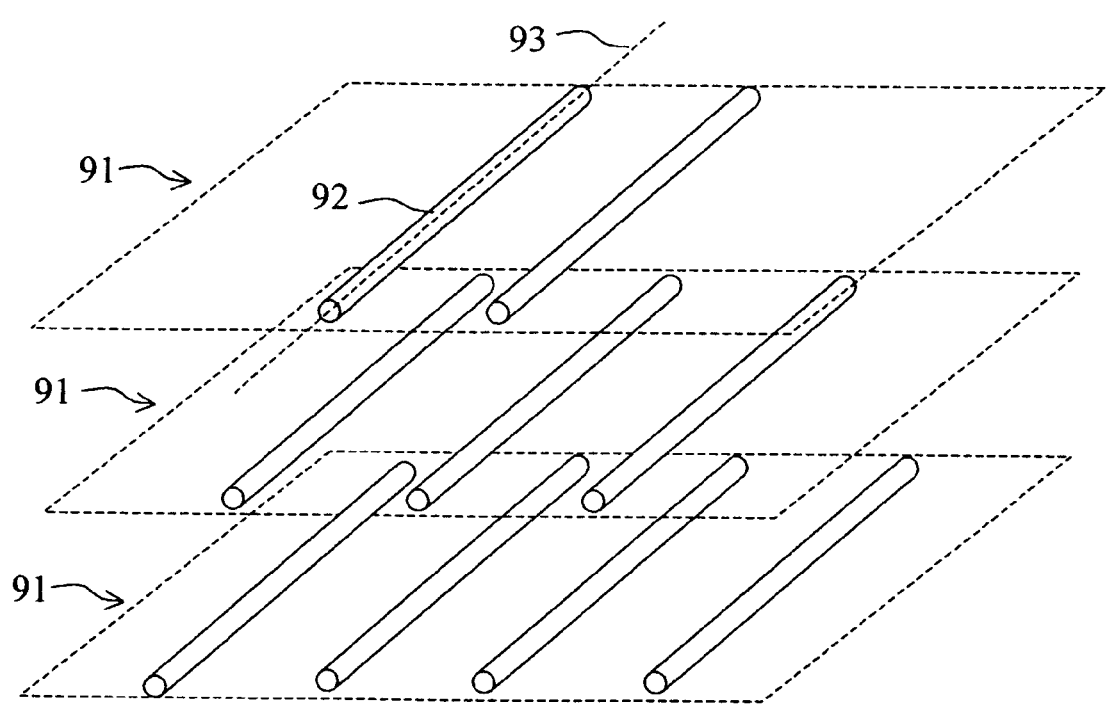
FIG. 6 represents a third variant of said arrangement.

FIG. 6 shows a variant of the arrangement described in FIG. 4. In this variant, the number of fluorescent tubes decreases arithmetically between each layer 91. The largest number of tubes 92 is situated near the bottom of the light box.

Figure 7:
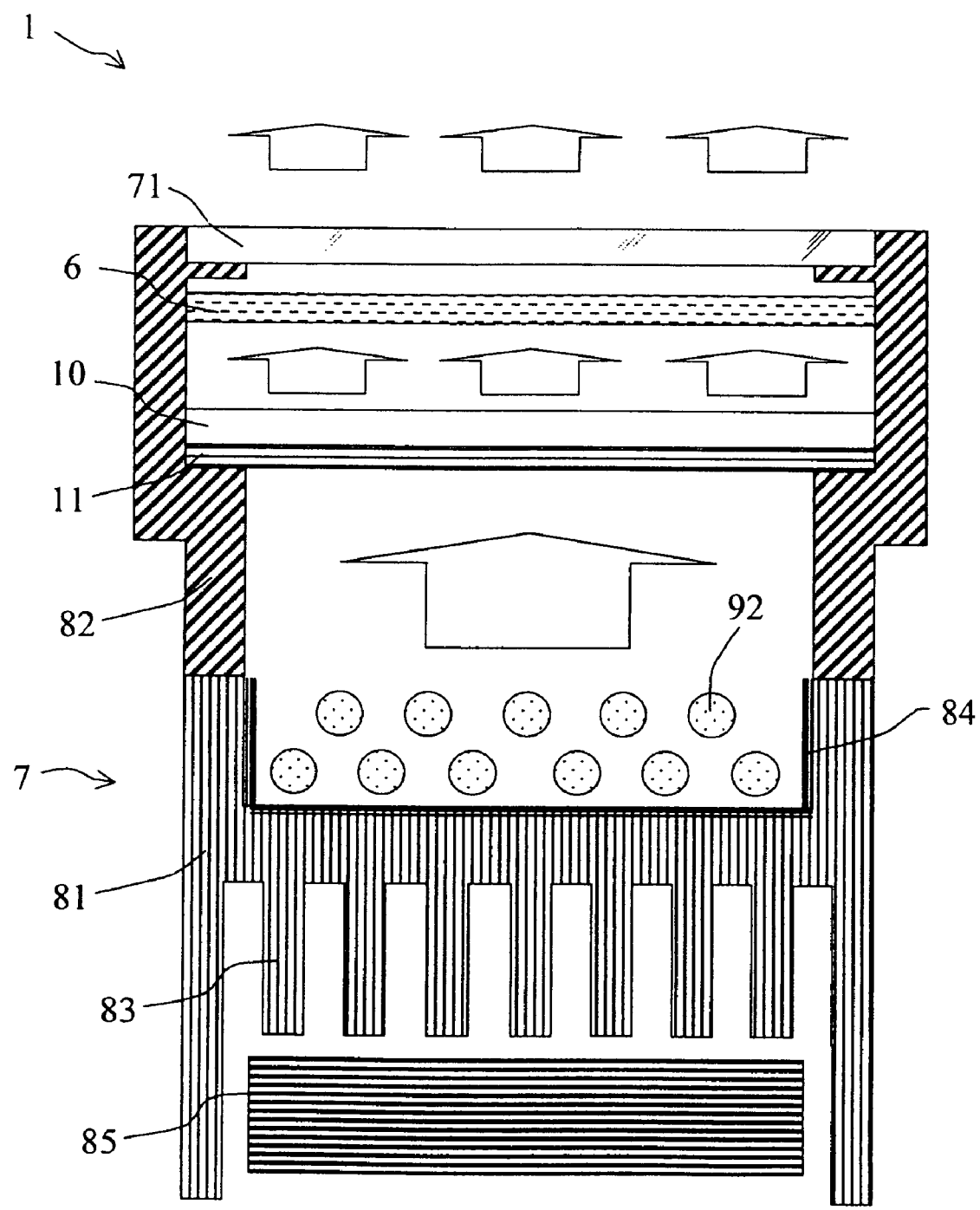
FIG. 7 represents a first cross-sectional view of the light box according to the invention.

FIG. 7 represents a cross-sectional view of the display screen 1 according to the invention in the case where the light sources are fluorescent tubes. The display screen 1 mainly comprises an optical valve 6 and a light box 7. The light box 7 mainly comprises a mechanical structure made up of two subassemblies 81 and 82.

The subassembly 81 constitutes the bottom and the bottom part of the side walls of said box. Internally, it includes a reflective and diffusing coating 84. Several layers of tubes 92 according to one of the arrangements described in FIGS. 3, 4, 5 and 6 are housed inside this part. The subassembly 81 comprises in its external part cooling fins 83 associated with a forced cooling system 85. This subassembly is made of a good heat-conducting material such as aluminum.

The subassembly 82 constitutes the top part of the side walls of the light box. This subassembly is mainly made of a poor heat-conducting material. It can, in particular, be made of NORYL type material. In its top part, it includes a recess in which the optical valve 6 is housed. Optical devices 10 and 11 are arranged between the fluorescent tubes 92 and the optical valve 6. The device 10 is intended to enhance the distribution of light energy falling on the optical valve. Said device 10 is an optical diffuser which can in particular be of holographic or microprism type.

The device 11 is intended to form a thermal barrier between the fluorescent tubes and the optical valve. It is made of a plate of a transparent material covered with an ITO type conductive treatment. A sealing window 71, located above the optical valve protects it from external attack, from fluids and from dust. The arrows in the figure indicate the direction of propagation of the light from the fluorescent tubes.

Figure 8:
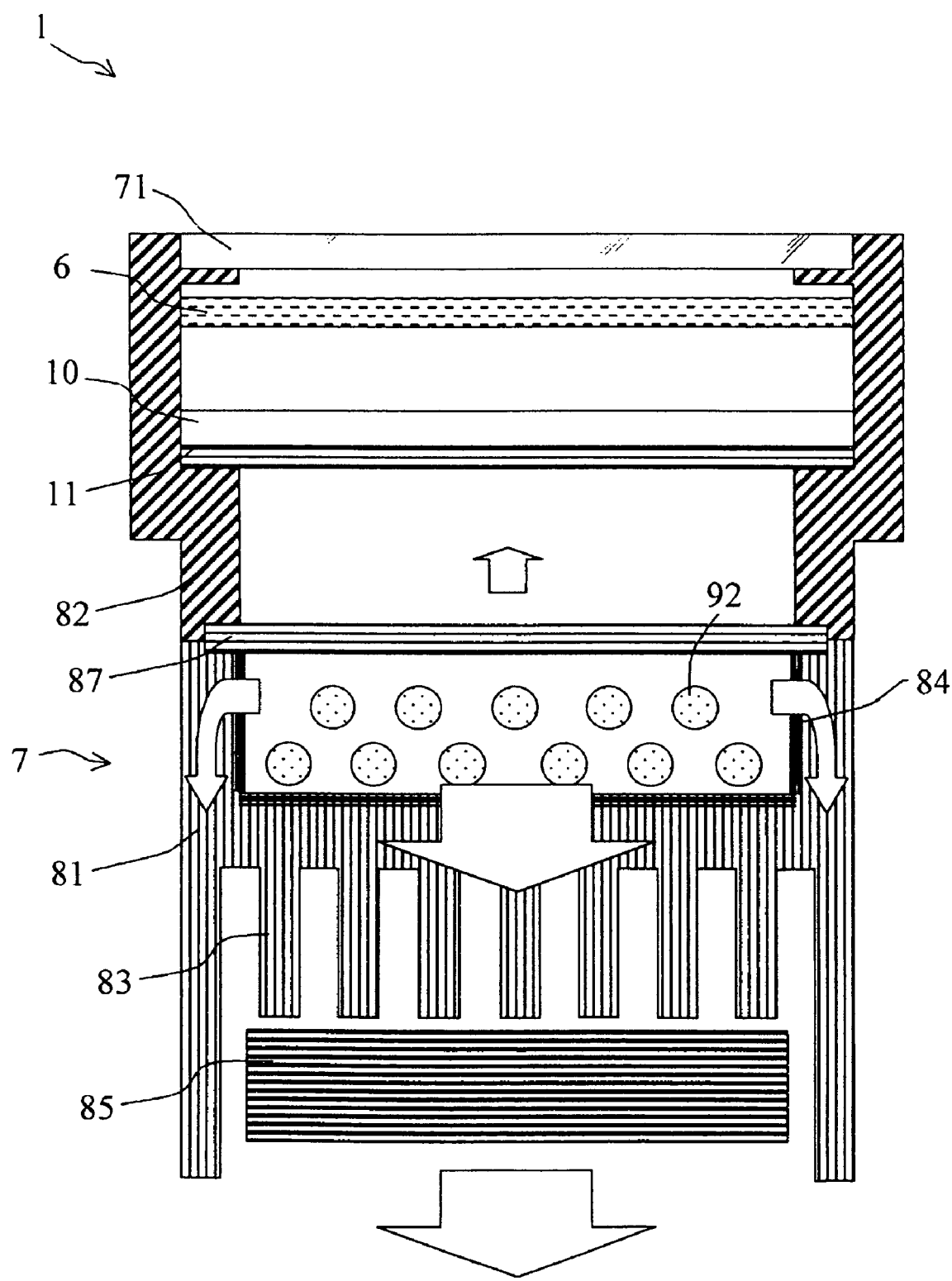
FIG. 8 represents a second cross-sectional view of the light box according to the invention.

FIG. 8 represents a variant of FIG. 7. A plate 87 has been added between the two subassemblies 81 and 82. The device 87 is intended to form an additional thermal barrier between the fluorescent tubes 92 and the optical valve 6. It is made of a plate of transparent material covered with an ITO type conductive treatment. The arrows in the figure indicate the direction of dissipation of the heat emitted by the tubes 92.

The invention claimed is:

1. A light box for display screen with optical valve comprising:
    a lighting system having several cylindrical fluorescent tubes, said box comprising at least one mechanical structure, wherein said structure including a top recess, side walls and a bottom, the optical valve being positioned in said top recess, the fluorescent tubes being distributed over several stacked layers, said planes of the layers being parallel to each other and parallel to the optical valve, the axes of the fluorescent tubes of each layer being parallel to each other, and equidistant, separated by a first distance and situated in one and the same layer plane, wherein the distance separating two successive layers is approximately equal to the first distance, the first distance being approximately equal to the maximum diameter of the fluorescent tubes.

2. The light box as claimed in claim 1, wherein the axes of the fluorescent tubes of a first layer are parallel to the axes of the fluorescent tubes of a second layer succeeding the first layer, said axes of said first layer being offset in a direction at right angles to that of the axes of the tubes of said second layer by a second distance equal to half the first distance.

3. The light box as claimed in claim 1, wherein the number of fluorescent tubes decreases arithmetically between two successive layers, the maximum number of fluorescent tubes being placed at the bottom of the light box.

4. The light box as claimed in claim 1, wherein the axes of the fluorescent tubes of a first layer and the axes of the fluorescent tubes of a second layer succeeding the first layer are at right angles to each other.

5. The light box as claimed in claim 1, wherein at least a first and a second different and independent electrical power supplies power the different layers of fluorescent tubes.

6. The light box as claimed in claim 5, wherein at least the first electrical power supply powers no more than three fluorescent tubes.

7. The light box as claimed in claim 6, wherein the luminance of the screen obtained by the fluorescent tubes powered by the first power supply source is equal to no more than approximately 10% of the maximum luminance possible on said screen.

8. The light box as claimed in claim 1, wherein at least one layer of fluorescent tubes is powered by two different and independent electrical power supplies.

9. The light box as claimed in claim 1, wherein the mechanical structure of the light box includes two mechanical subassemblies, the first subassembly comprises the top part of the side walls and the top recess, the second subassembly comprises the bottom part of the side walls and the bottom, the fluorescent tubes being positioned in the second subassembly, the first subassembly being made of a thermal insulating material and the second subassembly being made of a good heat-conducting material.

10. The light box as claimed in claim 9, wherein the mechanical structure of the light box includes optical elements of the spectral optical filter or optical diffuser or optical deflector type.

11. The light box as claimed in claim 9, wherein a plate of transparent material coated with at least one heat-conducting treatment separates the first mechanical subassembly from the second mechanical subassembly.

12. The light box as claimed in claim 1, wherein the ends of the fluorescent tubes are covered by an electrically-insulating material and a heat-conducting material, said ends being inserted in the bottom of the box, said bottom also being made of a heat-conducting material.

13. The light box as claimed in claim 1, wherein the external part of the bottom of the box has cooling fins associated with a forced cooling system.

14. The light box as claimed in claim 1, wherein the optical valve is an active liquid-crystal matrix.

15. A head-up or medium-head collimated display device wherein it includes a display device comprising a light box as claimed in claim 1.

16. The light box as claimed in claim 2, wherein the number of fluorescent tubes decreases arithmetically between two successive layers, the maximum number of fluorescent tubes being placed at the bottom of the light box.

17. The light box as claimed in claim 2, wherein the mechanical structure of the light box includes two mechanical subassemblies, the first subassembly comprises the top part of the side walls and the top recess, the second subassembly comprises the bottom part of the side walls and the bottom, the fluorescent tubes being positioned in the second subassembly, the first subassembly being made of a thermal insulating material and the second subassembly being made of a good heat-conducting material.

18. The light box as claimed in claim 2, wherein the ends of the fluorescent tubes are covered by an electrically-insulating material and a heat-conducting material, said ends being inserted in the bottom of the box, said bottom also being made of a heat-conducting material.

19. The light box as claimed in preceding claim 2, wherein the optical valve is an active liquid-crystal matrix.

* * * * *